United States Patent
Urabe (10) Patent No.: US 6,578,522 B1
(45) Date of Patent: Jun. 17, 2003

(54) PRESERVATION METHOD OF AQUATIC ANIMALS

(76) Inventor: Toshiro Urabe, 731, Oaza Ariakeura, Tsurumi-machi, Minamiamabe-gun, Oita, 876-1204 (JP)

( * ) Notice: Subject to any disclaimer, the term of this patent is extended or adjusted under 35 U.S.C. 154(b) by 0 days.

(21) Appl. No.: 09/623,763

(22) PCT Filed: Dec. 21, 1998

(86) PCT No.: PCT/JP99/05834

§ 371 (c)(1),
(2), (4) Date: Nov. 16, 2000

(87) PCT Pub. No.: WO99/45766

PCT Pub. Date: Sep. 16, 1999

(30) Foreign Application Priority Data

Mar. 12, 1998 (JP) .......................................... 10/106859
Oct. 13, 1998 (JP) .......................................... 10/290183

(51) Int. Cl.[7] .............................................. A01K 61/00
(52) U.S. Cl. ........................................ 119/203; 43/54.1
(58) Field of Search ................................ 119/203, 201, 119/214, 234; 43/54.1

(56) References Cited

U.S. PATENT DOCUMENTS

| 4,240,376 | A | * | 12/1980 | Kominami et al. | ......... | 119/214 |
| 5,463,983 | A | * | 11/1995 | Nagaura | ........ | 119/203 |
| 5,572,952 | A | * | 11/1996 | Manome | ........ | 119/203 |
| 5,722,345 | A | * | 3/1998 | Nagaura | ........ | 119/203 |
| RE35,895 | E | * | 9/1998 | Bass, Jr. et al. | ........ | 119/203 |

FOREIGN PATENT DOCUMENTS

| JP | 53-22557 | | 6/1978 | | |
| JP | 07-016037 | | 1/1995 | ........ | 63/2 |
| JP | 08-50956 | * | 2/1995 | ........ | 63/2 |
| JP | 07-184511 | | 7/1995 | ........ | 63/2 |

OTHER PUBLICATIONS

J. Japan Vet. Med. Assoc., 41(7):110–112, 1988.

* cited by examiner

Primary Examiner—Robert P. Swiatek
Assistant Examiner—Bethany L Griles
(74) Attorney, Agent, or Firm—Sheridan Ross P.C.

(57) ABSTRACT

An idealistic preservation method of aquatic animals capable of reliably suppressing motion functions of large quantities of living fish, etc., and transporting fish while keeping freshness and quality for a long time during transportation so that large quantities of living fish, etc., can be transported in a small space. Fish (10) is scooped with a landing net from a tank and is laid down on a table. An operator preferably wears wet gloves lest his body temperature damages fish. While being held down by one hand, fish (10) is pierced from inside an operculum (21) through the spinal cord (1) by a tool (100). The piercing position is near the medulla oblongata (11) and is extremely effective for lowering the motion function. If the medulla oblongata (11) itself is damaged, fish (10) will die completely. Therefore, caution should be taken not to damage it.

11 Claims, 9 Drawing Sheets

Figure 5. Survival Temperature Ranges of Several Fish Species

Survival Temperature Range

| Species | Mass (g) | Voltage (V) | Frequency (Hz) |
|---|---|---|---|
| Horse Mackerel | 60–100 | 56 | 100 |
| | 250–300 | 70 | 100 |
| Red Sea Bream | 100–150 | 56 | 100 |
| | 300–350 | 70 | 100 |
| Pigfish | 300–350 | 70 | 100 |
| | 400–500 | 70 | 100 |
| Yellowtail Tuna | 500–600 | 70 | 100 |
| Cuttlefish | 200–250 | 70 | 50 |
| | 300–400 | 70 | 50 |
| Lobster | 150–200 | 70 | 50 |

Figure 11.

PRESERVATION METHOD OF AQUATIC ANIMALS

TECHNOLOGICAL FIELD

The invention relates to preservation methods for aquatic animals developed as techniques for preserving the freshness of aquatic animals including fish, crustaceans such as prawns and crabs, and cephalopods such as squids and octopuses when such animals are to be transported in live form mainly for distribution as food.

BACKGROUND TECHNOLOGY

Capturing and delivering to the consumer aquatic animals including fish, crustaceans such as prawns and crabs, and cephalopods such as squids and octopuses in a live state allows for high pricing of the merchandise. This being the case, significant effort has been exerted in this field.

Fish, cephalopods, and other such aquatic animals are generally transported in a vehicle equipped with a preservation tank. A widely used method for transporting crustaceans involves packing them in sawdust.

However, it is clear that forcing animals that live in the wide ocean into a confined environment for transport has a negative physical effect. There are limits to the transport as well—the types, sizes, and numbers of transportable animals are limited. Furthermore, transport via a preservation tank, which requires a special vehicle, is expensive. This form of transport presents many issues requiring addressing, such as physical damage to the animals from bumping or fighting within the tank and weakening due to the poor conditions. As well, the animals face many risks before being delivered to the consumer.

A large problem facing live cephalopods transported in sawdust is weight loss, so this means is suited only for very short-term transport.

Therefore, animals that could not be transported using the above methods, or those requiring long-term transport, had to be frozen or processed where they are caught.

Various research studies are being conducted to eliminate these transport-related problems.

There is a need for a method for transporting fish and similar animals in a live state that prevents deterioration during shipping, enables the animals to withstand long-term shipping, and is suited to high-volume transport. Such a method would reduce or suppress the motor functions of the live fish and preserve them in a confined area while adequately maintaining their respiratory systems and other life support functions.

Methods disclosed in Japanese Unexamined Patent Application Publications (Kokai) H7-16037 and H7-50956 relate to cutting or damaging the spinal cord or cranial region of live fish with an implement that is heated to a high temperature or electrically charged in order to slow motor functions.

But the spinal cord is a large neural bundle that plays an essential life support role in vertebrates. A seriously damaged cord may lead to a quick death. In the above-mentioned prior art, treatment is conducted with a heated or electrically charged surgical implement in order to stop the flow of blood and prevent infection. But metal chopsticks and saws, examples of these implements, may cause more than the minimum necessary damage, and dedicated training is required to perform the task properly. Externally locating the spinal cord of a fish is particularly difficult. If the proper spot is missed and the fish is consequently probed repeatedly, it will become extremely weak and not be able to withstand long-term preservation.

This method is not suitable for the horse mackerel and other small fish.

Treating the sides of fish with the above implements causes external scarring, which notably lowers the price when the fish are to be served live.

Examples of conventional methods to control motor functions are a technique that uses low temperatures and one that applies an electrical shock. But no method that can fulfill the needs of distribution has yet been developed.

The inventor believes the major cause of these problems to be a lack of adequately preparing the physiology of the animals for the rigors of distribution. His earnest research has led to the invention of preservation methods for aquatic animals that, according to the variety of aquatic animal caught, suppress the motor functions of the animal in a manner suited to its physiology and preserve the animal in a way that allows it to fully withstand shipping.

DISCLOSURE OF THE INVENTION

The invention establishes treatments that temporarily or semi-permanently suppress the motor functions of aquatic animals and preserve the animals at or below their minimum survival temperature or in disinfected water. Therefore, aquatic animals survive motionless even in a small container, and such small containers may be used for transport via truck, so large amounts of aquatic animals can be maintained in a state of excellent vitality and delivered to the consumer at a low shipping cost. Not only do the animals remain immobile, but the methods lack the danger present in processing under the above-mentioned prior art. The problems of injury to the organisms and weight loss are thus solved outright.

PREFERRED EMBODIMENTS OF THE INVENTION

The invention establishes treatments that temporarily or semi-permanently suppress the motor functions of aquatic animals. The methods do not cause death, and processing can be performed safely and accurately. The inventor—realizing that there are minimum survival temperatures suited to the physiology of the animals on which the treatments are used—discovered that the animals survive at temperatures at or below this minimum water temperature without acclimating.

Safe and accurate methods are selected and performed based on the species of animal to be treated. The details of each treatment are presented in the working examples, but an overview is given here.

Fish are the only vertebrates among the aquatic animals described herein, so their motor functions can be semi-permanently suppressed by injuring a part of the spinal cord. Considered alone, this point of spinal cord treatment is similar to that in the prior art, but the fact that more than the necessary amount of damage is not applied differs. In greater detail, the exact location of the spinal cord is determined according to the type of fish, and the cord is pierced with an implement having a sharp and pointed tip, thus minimizing the amount of damage from the piercing to the fish. Life support functions are not damaged because treatment is accurate and minimal, the treatment is easily repeated, and no scar from treatment is left. Therefore, the treatment is more safe and accurate than those of the prior art, the price of the product is not lowered, and the number of fish lost to mistakes is minimized. The treatment holds excellent utility.

The motor functions of cephalopods, crustaceans, and similar invertebrates are temporarily paralyzed with an electrical treatment. Keeping the animals in water at least 5° C. below their minimum survival temperature maintains the electrically induced paralysis. This method may be used on fish in a similar manner.

Then, in the preservation of the treated aquatic animals, the most appropriate environmental conditions for the species of animal are selected to restrain autonomous functions such as breathing and excretion below normal levels and thus both lower oxygen intake and prevent a drop in water quality due to excreta. This enables long-term transport needing only simple preservation facilities.

The inventor has confirmed that animals whose motor functions have been electrically suppressed do not recover from paralysis when preserved in water colder than the minimum survival temperature. Moreover, fish that receive spinal treatment may be preserved in water within the survival temperature range for a duration identical to that in the case of water below the minimum survival temperature provided the water has been disinfected.

Advantages common to both methods are, as mentioned above, that treatment is safe and accurate, there is no physical deterioration—meaning injury or weight loss—during preservation, and transport with simple facilities is possible because oxygen intake and the level of excretion are low.

Hereafter, working examples suited to each species will be described in reference to the drawings.

WORKING EXAMPLE 1

In Working Example 1, the spinal cord of a fish is pierced with an implement having a sharp and pointed tip to semi-permanently disable a portion of the animal's motor functions while maintaining respiration and other life support functions.

Figure 2:
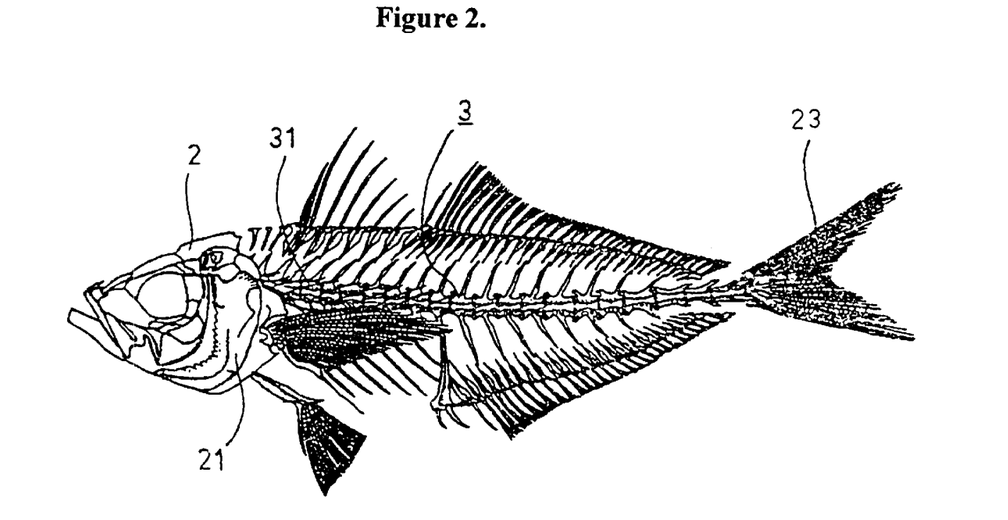
FIG. 2 is a schematic diagram showing the skeleton of this fish in abbreviated form.
Figure 3:
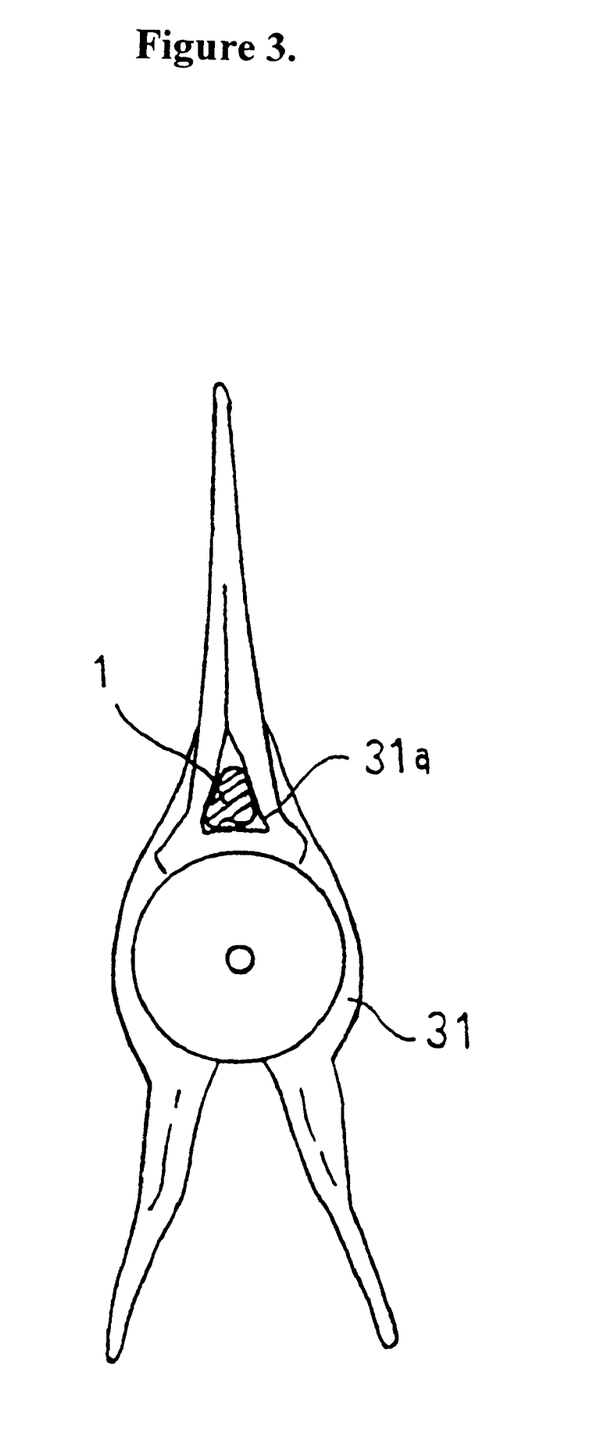
FIG. 3 is a view looking from the head of one of the abdominal vertebrae.

Put simply, a typical fish skeleton, such as that shown in FIG. 2, comprises a clustering of bones in the cranial area 2, a vertebral column 3 stretching to a caudal fin 23 to the rear of the animal, and the individual fins. The vertebral column 3 is formed from a plurality of vertebra 31 linked in a linear fashion. A spinal cord 1 passes through a vertebral foramen 31a located ventrally, extending from a medulla oblongata (not shown) to the caudal fin 23 (FIG. 3). The spinal nerves (not shown) extend in pairs from the spinal cord 1 to the peripheral nerves, governing movement in the fish.

It is preferable to pierce a location near the medulla oblongata, but the fish, along with the effort spent treating it, is lost if the medulla oblongata is damaged, so the location of the medulla oblongata should be readily identifiable to the person administering treatment. The specific location varies according to species, so the site to be pierced should be verified through dissection or fluoroscopy once. Thereafter, the site should be determined from the shape of the gills and the location of the lateral line.

Figure 1:
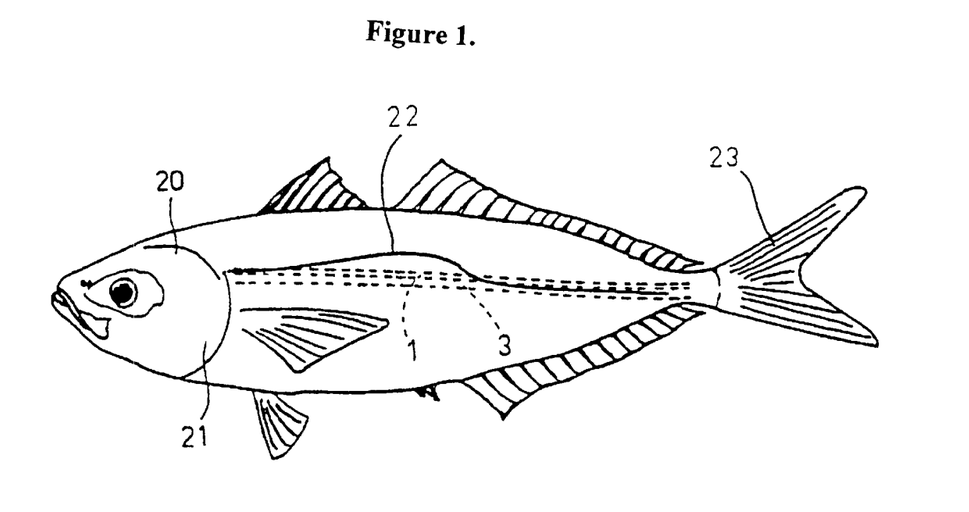
FIG. 1 is a lateral view of a fish showing an example of the treatment location in Working Example 1.

As FIG. 1 shows, a lateral line 22 in many species of fish generally extends from a head 20 to the caudal fin 23, serving as a mechanical sensory receptor that detects movement of the surrounding water and organisms. It follows that a portion of the lateral line is located near the central nerves of the head 20. Opercula 21 cover the outside of the gills (not shown), which convert venous blood pumped from the heart to arterial blood. This arterial blood in turn passes ventrally beneath the vertebral column 3 and travels throughout the body. It follows that the upper edges of the opercula 21 are proximal to the vertebral column 3 in many species of fish. The spinal cord 1, the subject of the treatment, should be located within the fish near the anterior end of the lateral line 22 and the upper edge of the opercula 21.

Recognizing this, the inventors analyzed many fish through dissection and confirmed that the spatial relationships among the spinal cord, the lateral line, and the opercula are identical across the members of any species of fish. With the lateral line and opercula being obviously located in most fish, the inventors discovered that the former, along with the upper portion of the latter, can be used as landmarks to identify the location for inserting the implement, the tip of which is highly likely to reach the spinal cord.

The tip of a fine, pointed implement is used to pierce the spinal cord. The implement should be able to penetrate the scales, tissue, and vertebral column such that its tip can reach the spinal cord when inserted laterally into the fish. It should also not cause excessive damage and allow the penetrated tissue to elastically seal the wound. A needle-like object or an implement with a flat blade is therefore preferable. An implement with a width (thickness) approximating that of the spinal cord of the fish to be treated is appropriate.

The implement should be inserted into the upper portion of the inside of one of the opercula so that the tip reaches the spinal cord where it passes through the vertebral column. When a vertebra is pierced and the instrument withdrawn, the surrounding tissue will elastically seal the wound. Major arteries and veins of fish are located along the vertebral column and the lower vertebrae. The flow of blood accompanying the piercing of the spinal column comes from the nearby capillaries, is small in volume, and quickly stops. This means that the spinal cord, which is the subject of the treatment, is the only part damaged from the treatment.

Of course, the spinal cord to be pierced is not visually or transparently apparent, so the condition in which the implement leaves the spinal cord is not determinable. It is believed that the function of the spinal nerves are damaged from the cutting, injuring, fracturing, or bending of the spinal cord due to the piercing.

Performing the treatment on large fish such as tuna soon after capture is difficult, because such fish generally thrash about. Large fish are forcefully restrained from moving and then treated. In detail, the fish are temporarily stunned using an electrical shock, suppressed with an inflatable bag or similar mechanical means, and treated in the above manner.

The above spatial relationship among the spinal cord, opercula, and lateral lines is not necessarily present in all species of fish. There are also many species with unclear lateral lines, which makes determining the location to pierce even more difficult. It is therefore preferable to dissect a given species of fish to determine the location of the spinal cord before performing treatment on that species. The findings of dissection can be used as standards in all subsequent treatment on that species.

Figure 5:
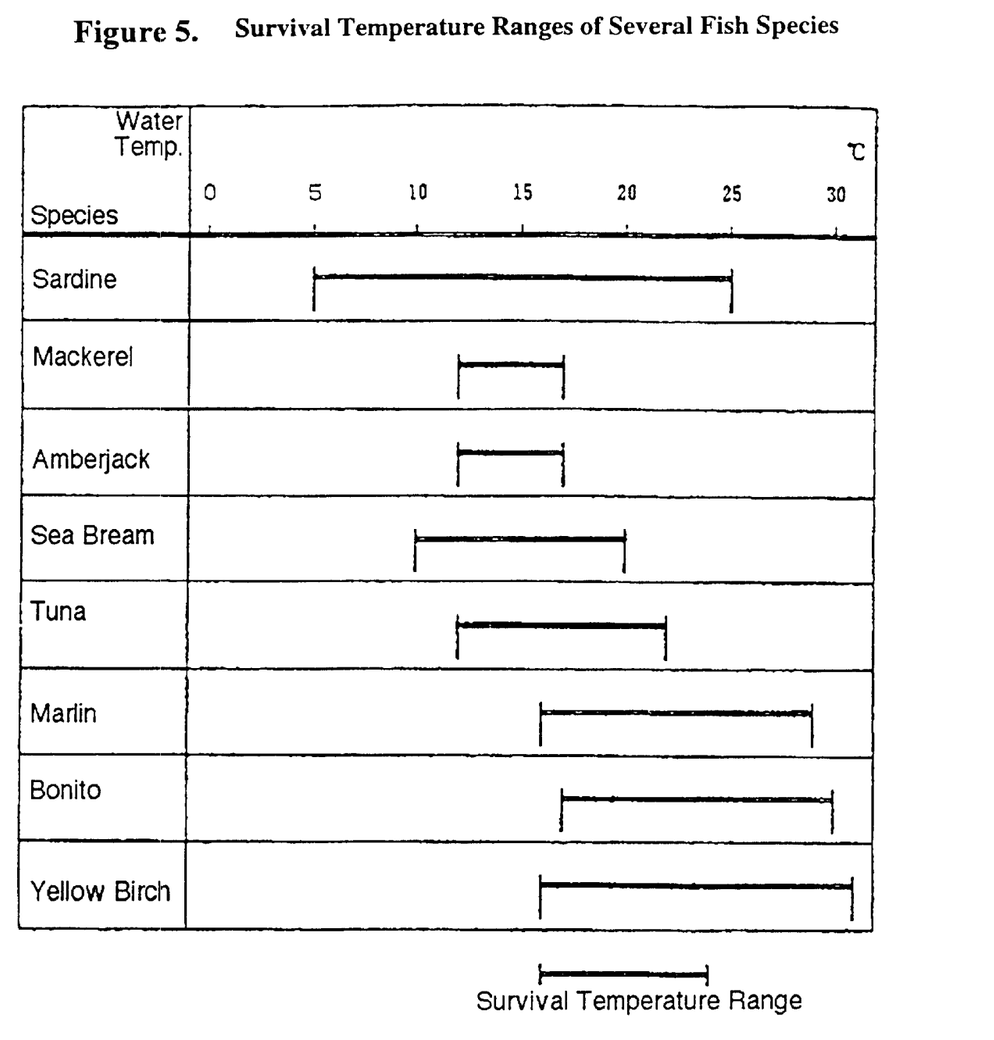
FIG. 5 is a graph showing the survival temperature ranges of various fish species.

The preservation method will be described in greater detail in Working Example 2 below. The animals are stored at a temperature lower than the minimum life support temperature, preferably 5° C. lower. This temperature range can be applied for preservation specifically because of the above treatment. The range of approximately 0–5° C. conventionally proposed was too cold for certain species of fish and sometimes resulted in death. At other times, it fell within the optimal temperature range for the fish and did not suppress autonomous functions. FIG. 5 shows examples of survival temperature ranges.

Hereafter, procedures and related experiments will be discussed in detail.

Figure 4:
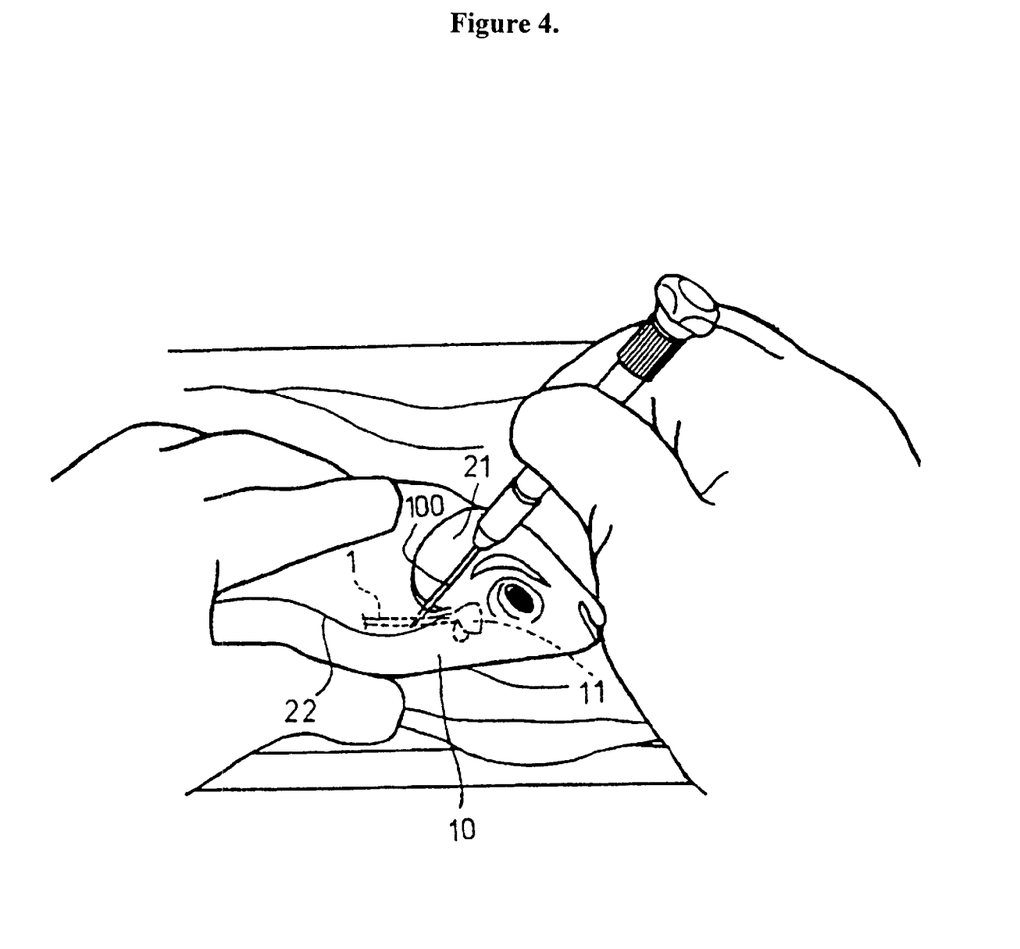
FIG. 4 illustrates one example of spinal cord treatment used in the invention.

As shown in FIG. 4, a fish 10 is taken from its tank with a net and placed prone on a workbench covered with a wet towel. Wet gloves should be worn to keep the body heat of the person treating the fish from harming the fish. Setting the temperature within the tank to the lower end of the survival temperature range will slow the motor functions of the fish 10 and thus improve workability.

While the fish 10 is held with one hand, the spinal cord 1 is pierced from the inner side of the operculum 21 with an implement 100. When doing this, the location of the spinal cord 1 should be determined as described above. In most cases, when this location, which is relatively close to the medulla oblongata 11, is determined with the above method and pierced with the implement, the motor functions are very effectively suppressed. However, damaging the medulla oblongata 11 itself will kill the fish 10, so care must be taken to avoid damaging it.

If the fish 10 treated in this way is put in a container with holes for circulation placed in an aerated tank, the live fish can be preserved for an extended period of time, and the freshness of the fish, maintained. Furthermore, the fish does not move, so it expends little energy and the respiratory period grows longer. Consequently, the amount of oxygen consumed decreases. The animals can be stored at a density during transport greater than that possible conventionally, while being maintained with an aeration device of a conventional scale. Differing fish with overlapping survival temperature ranges can be stored together.

The fish do not thrash about when being weighed or prepared, so they are very easy to handle and do not cause injury with their fins.

The following describes the treatment applied to a horse mackerel, a red sea bream, and a yellowtail tuna under the methods prescribed in Working Example 1.

Experiment 1

In preparing to treat a horse mackerel in this experiment, a horse mackerel was dissected in advance to determine the spatial relationships between the opercula, the lateral line, and the spinal cord.

Next, a towel was wet with water of approximately the same temperature as the 18° C. tank water and spread on a workbench. The person administering the experiment put on gloves wet with water, caught a 300-gram horse mackerel—which was of a size approximating the one dissected—and laid it prone on the workbench. While restraining the fish with one hand, the administrator pierced the spinal cord from the inner side of one operculum with a needle-shaped implement having a diameter of 1 mm. The treated horse mackerel remained motionless even when placed on the administrator's palm and was therefore easy to weigh. Although the fish had lost virtually all motor functions, it continued respiration via its gills. The administrator preserved the fish by storing it in a container with holes for circulation within an aerated tank. After being preserved in this manner for ten days, the fish was taste-tested as sashimi with a normal live fish that was fed during the ten days. The two were identical in quality and flavor.

Experiment 2

A red sea bream of about 150 g was prepared in a manner similar to that described in Experiment 1. The lateral line of the red sea bream is particularly prominent, so without any initial dissection, the point at which the front end of the lateral line intersects the upper edge of one operculum was taken to be the location of the spinal cord. The implement was inserted here. The red sea bream, as did the horse mackerel above, continued gill respiration but moved very little. It was confirmed to survive for a 12-day period. A subsequent dissection revealed scarring in the location where the spinal cord had been pierced.

Experiment 3

As in Experiment 2, the shapes of the lateral line and opercula of a yellowtail tuna of about 2.5 kg were used as landmarks for piercing. Once its spinal cord was pierced, the fish ceased most movement other than that associated with gill respiration. The yellowtail was similarly preserved, and was noted to survive for a 30-day period. Again, a subsequent dissection revealed scarring in the location where the spinal cord had been pierced. The quality and taste of the yellowtail were compared and noted to be similar to those of a normal, live yellowtail. No decrease in fattiness was noted.

Experiment 4

In order to suppress the motor functions of a large, 2 kg yellowtail in this experiment, the experiment administrator kept the fish from thrashing about and pierced its spinal cord with the implement.

A low-frequency electric current was used as the means for keeping the fish from thrashing about. Its spinal cord was pierced while it convulsed under the current.

A 70 volt DC current pulsating at 100 Hz was used. One electrode was held near the caudal fin, and the other was placed near the head. This caused the yellowtail to arch its body and begin convulsing. When the electrodes were removed after being kept in this position for a few seconds, the fish fell motionless, at which time the implement was used to pierce the spinal cord. The yellowtail was put into a condition identical to that brought about in the other experiments and was therefore able to be preserved for an extended period in a tank.

WORKING EXAMPLE 2

In the description of Working Example 2, a preservation method for the preservation of a term longer than that in Working Example 1 is presented.

Many organisms, fish included, have optimal survival temperatures. Organisms fall victim to damage at temperatures other than their optimal temperature and soon perish when their minimum or maximum survival temperature is exceeded. This is also true for fish, which have optimal temperature ranges and minimum and maximum survival temperatures that vary by species. However, it is known that keeping a fish in an environment with a temperature near this minimum or maximum for a certain period of time will bring a thermoresistant change to the fish, causing acclimation. For example, if a red sea bream with a minimum survival temperature of 7° C. were acclimated to a temperature of 8° C., its survival temperature range could be expanded to a minimum of 2° C.

The motor functions of a fish drop with a corresponding drop in water temperature, as do both its consumption of nutrients and oxygen and the activity of bacteria in the tank. Mindful of this, researchers have conducted a variety of studies on ways to preserve live fish at low temperatures. Methods based solely on acclimation, however, require time, equipment, and increase in energy to acclimate the fish. The very high cost involved makes these methods unsuitable for pisciculture.

An experiment on thermoresistance was conducted with fish whose motor, functions had been suppressed using a method of the invention.

The survival temperature range of the fish used in this experiment—ten mackerel with a minimum of 9° C.—was relatively narrow. The fish were treated to suppress motor functions using the method described in Working Example 1. Five of the ten fish were placed in water at a temperature of 4° C.–5° C. lower than the above-mentioned minimum survival temperature—without being acclimated. The remaining five were kept at their optimal temperature of 15° C.

In comparing survival times, the five fish preserved at 5° C. were noted to survive for a period of 20 or more days, but the five in the 15° C. water began having difficulty respiring after the tenth day and began dying on the 13$^{th}$ day. The experiment was therefore ended.

Comparative observations on respiration conducted during the period the fish were alive revealed sluggish respiration in the fish in the 4° C. water. It was therefore surmised that oxygen intake was lower than in the other group.

The difference in survival times is thought [in the case of the higher temperature group] to stem from the synergism of the consumption of energy in life support activities and injury-causing bacteria because both active life support functions such as respiration and the activity of bacteria are actuated at the optimal temperature.

The reasons for the extended survival time below the minimum survival range are thought to come from the motor function loss caused by the treatment of the invention and the lack of acclimation due to no heavy damage to the functions of the respiratory and circulatory systems. Moreover, in cold water, oxygen intake drops due to a slower rate of respiration despite the increased concentration of dissolved oxygen. Lower temperatures also slow the proliferation of bacteria that threaten the survival of the fish. This likely accounts for the large disparity in the number of days survived.

WORKING EXAMPLE 3

Working Example 3 relates to a method for temporarily suppressing motor functions of animals using an electrical treatment.

An example of the device used when suppressing the motor functions of aquatic animals in this working example will be discussed first, for clarity's sake.

Figure 6:
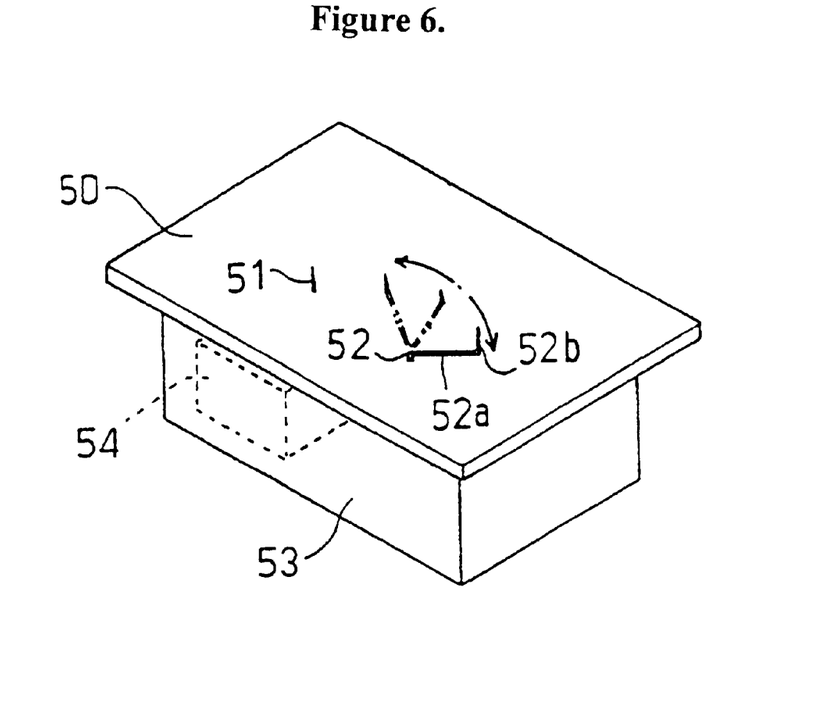
FIG. 6 is a perspective view of one example of an electric processing device.

FIG. 6 shows the device used in this working example. It comprises a containment box 53 that houses a low-frequency current generator 54, a working platform 50 affixed on top of the box, and a first electrode 51 and a second electrode 52 connected to the low-frequency current generator 54. The electrodes, the tips of which are pointed and needle shaped, extend from the upper surface of the working platform 50. The extent to which they protrude can be adjusted.

The first electrode 51 can only be vertically adjusted—it is not movable horizontally. The second electrode 52 comprises a horizontal arm 52a and an upward facing tip 52b that extends perpendicularly from the arm. The arm 52a can be horizontally rotated over the working platform 50 to alter the horizontal position of the tip 52b. This configuration allows the position of each electrode to be changed to accommodate the shape of the animal to be treated. Although pads may be used as the electrodes, the reason pointed, needle-shaped electrodes capable of piercing the covering of the subject animal were employed is that their effectiveness had already been demonstrated.

In order to treat an animal using this device, the working platform 50 is first opened and the low voltage current generator 54 is started in advance. Next, an adjusting device (not shown) located on the lower side of the working platform 50 is used to adjust the positions of the electrodes to accommodate the species to be treated. Then, the working platform 50 is closed to conclude the preparatory phase.

Figure 7:
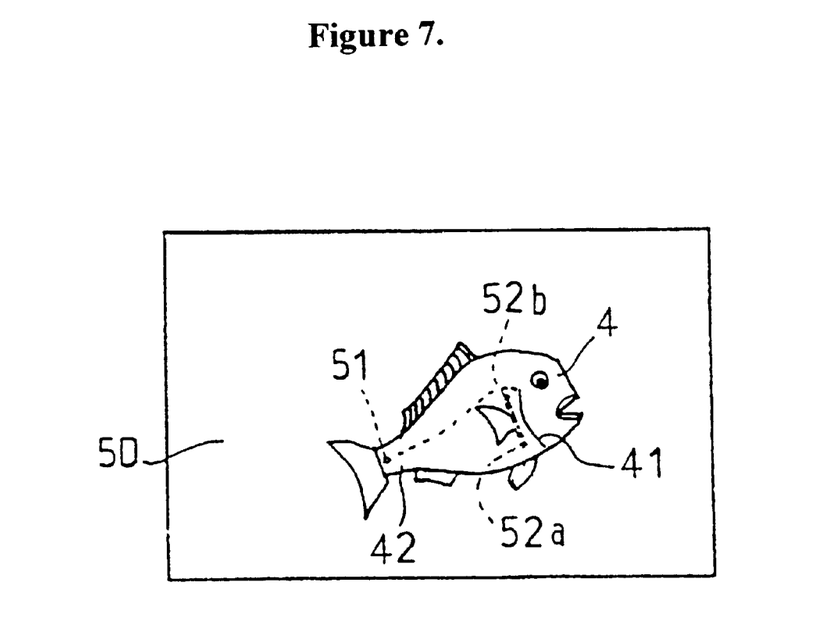
FIG. 7 shows the area on a fish into which electrodes should be inserted.

Next, actual treatment is conducted. In the case of a fish, for example, the electrodes are positioned so as to deliver low-frequency pulses to an area behind the medulla oblongata in order to avoid affecting the functioning of the brain and heart. In detail, a fish is taken from a tank. As shown in FIG. 7, the first electrode 51 is pierced through posterior end 42 of the fish 4, and the fish 4 is pressed down so that the tip 52b of the second electrode 52 pierces the area slightly behind the operculum 41. Immediately after current is passed through the two electrodes in contact with the fish 4, its body will become rigid, and its mouth and operculum will remain open. Once current has been maintained for 5–10 seconds so that the fish remains in this state, the color of the fish will gradually become discolored, and the operculum 41 and the mouth will close. But the dorsal and ventral fins will remain standing, indicating that the fish's body is still rigid. After the mouth and operculum 41 have closed and then the operculum 41 is noted to open and close slightly, the fish is lifted from the electrodes. This portion of the treatment requires from ten to 60 seconds, but the hands need not be used because the fish does not thrash about.

This electrical treatment temporarily immobilizes the fish 4, so that it does not move even when raised. However, the slight opening and closing of the operculum 41 indicate that the fish is respiring.

Figure 10:
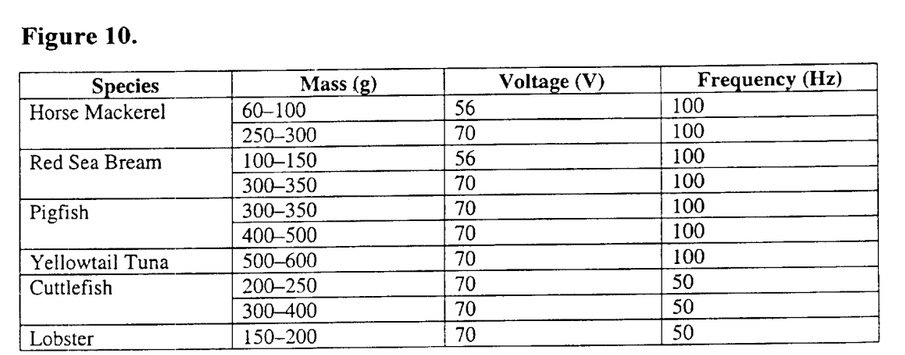
FIG. 10 is a table listing examples of low-frequency current settings.

The voltage and frequency of the low-frequency current is set according to the size and species of the animal. (See FIG. 10.)

Fish treated in this manner are then appropriately preserved. Fish destined for long-term transport are placed in a cold water tank to numb the fish and inhibit revival. The temperature used varies by species, but a temperature 5° C. to 10° C. below the minimum survival temperature is desirable. The length of time the animal is immersed is preferably from one to five minutes. If the animal is a fish, it may be-turned belly-up to confirm that the cold water has not acutely damaged life support functions. Slight opening and closing of the opercula indicate that the animal is all right. Note that immersing the animal for too short a time will not allow the cold water to act.

The fish exposed to the cold water is completely removed from the water and placed in another tank with water below but near the minimum survival temperature of the fish. Live fish preserved at low temperatures in this manner continue to respire with their gills, but they refrain from swimming, require no feeding, and produce few excreta. This means that the tank they are transported in remains clean. As they do not move, they, take in little oxygen.

Moreover, as the fish do not swim, a large preservation tank seen conventionally need not be attached to the transporting vehicle. An insulated container alone, equipped with an oxygen-supplying device large enough to hold the treated animals, is adequate. A possible configuration is a Styrofoam container filled with cold seawater and equipped with a battery-powered oxygen supplying device. Treated animals would be put within the container, and the container would be sealed and directly delivered to general households or other locations via a delivery service.

The animals, to be revived after shipping, need only be placed in a tank containing water at the animal's optimal temperature. An animal lies prone at the bottom of such a tank soon after being moved from the low temperature tank, but begins moving within a few minutes and starts swimming in a nearly normal fashion within an hour's time, indicating that motor functions have been restored. Such fish may be used in the display tanks at the front of restaurants.

Next, treatments with the above treatment device and experiments on preserving animals electrically will be described.

Experiment 5

A 250 g horse mackerel was electrically treated at a voltage of 70 V and a frequency of 100 Hz. About 60 seconds of exposure to the current brought the fish to a near motionless state save slight gill respiration. It was removed from the working platform and placed in a cold-water tank containing 3° C. water for 60 seconds. During this time, the fish remained belly-down, kept its mouth open, and exhibited slight gill respiration. It was then removed from the cold-water tank and placed in another cold-water tank containing 10° C. water for ten hours. The fish acted as it did in the first cold-water tank.

Afterward, the fish was moved to a midrange-temperature water tank containing 16° C. water. No immediate changes were noted, but once released, the fish gradually began moving and started swimming vigorously and normally in about 30 minutes.

The fish was then eaten as sashimi, which displayed the characteristic texture of sashimi derived from live fish.

Experiment 6

A 400 g pigfish was electrically and thermally treated as described in Experiment 5 above and preserved for 12 hours in low-temperature water. The parameters of the experiment are given below.

The voltage was 70 V, the frequency was 100 Hz, the time of electrical exposure was 60 seconds, the cold-water temperature was 3° C., and the temperature of the preservation water tank was 10° C.

The fish was then revived at a midrange temperature of 16° C. It began swimming normally in about 10 minutes and heartily ate when fed.

Experiment 7

A cuttlefish, which is a cephalopod, was treated in the same manner.

Figure 8:
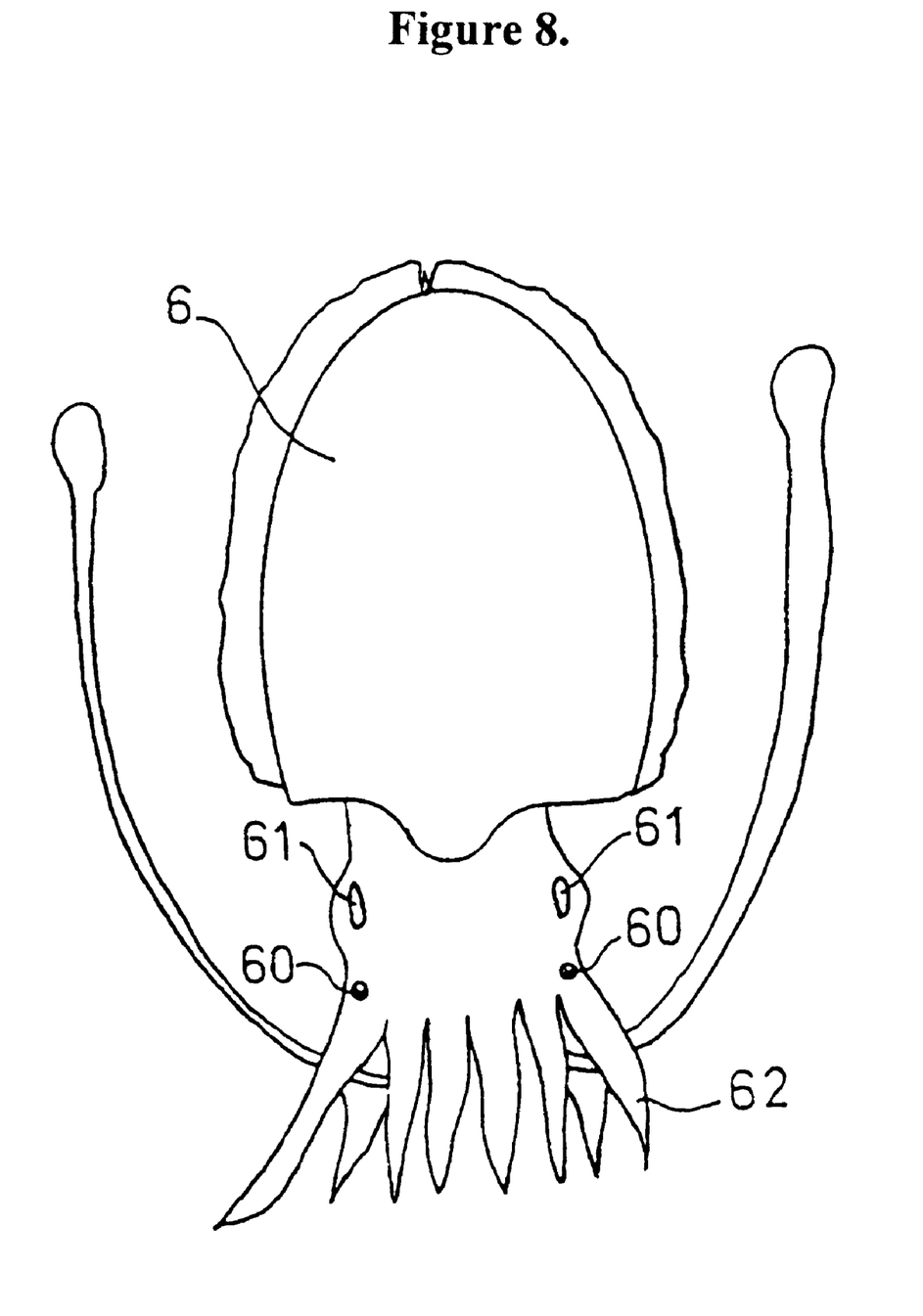
FIG. 8 is a schematic diagram illustrating a treatment method for a squid.

As FIG. 8 shows, the electrodes were placed against lateral areas 60 between eyes 61 and bases of the tentacles 62. The animal used in the experiment, a cuttlefish 6, had a mass of 400 g. It was exposed to electricity at 70 V and 50 Hz for 60 seconds. Upon electrification, the cuttlefish 6 extended its tentacles toward the electrodes but gradually became motionless and faded in color. During this time, the animal's siphon valve operated normally, indicating that gill movement for respiration was occurring. The current was stopped when leg movement had stopped and other motion had nearly ceased.

Thereafter, the tentacles remained motionless when held in the hand, but water issuing from the siphon valve showed that respiration was occurring. As with the fish, the cuttlefish was similarly placed in 5° C. water for one minute and thereafter transferred to a cold-water tank containing 12° C. water for 24 hours. Respiration, excretion, and siphon valve operation during this time were normal, so treatment is thought to have no effect on the preservation period. Even when the cuttlefish was placed in a small container with other squid, it remained injury free, not grabbing or biting the others.

After preservation, the cuttlefish was eaten as sashimi, which had an excellent clarity and exhibited the quality and taste of freshly caught cuttlefish.

Experiment 8

A lobster, a crustacean of the order Decapoda, was used in this experiment. A healthy lobster removed from its tank will thrash about, expanding and contracting its tail.

Figure 9:
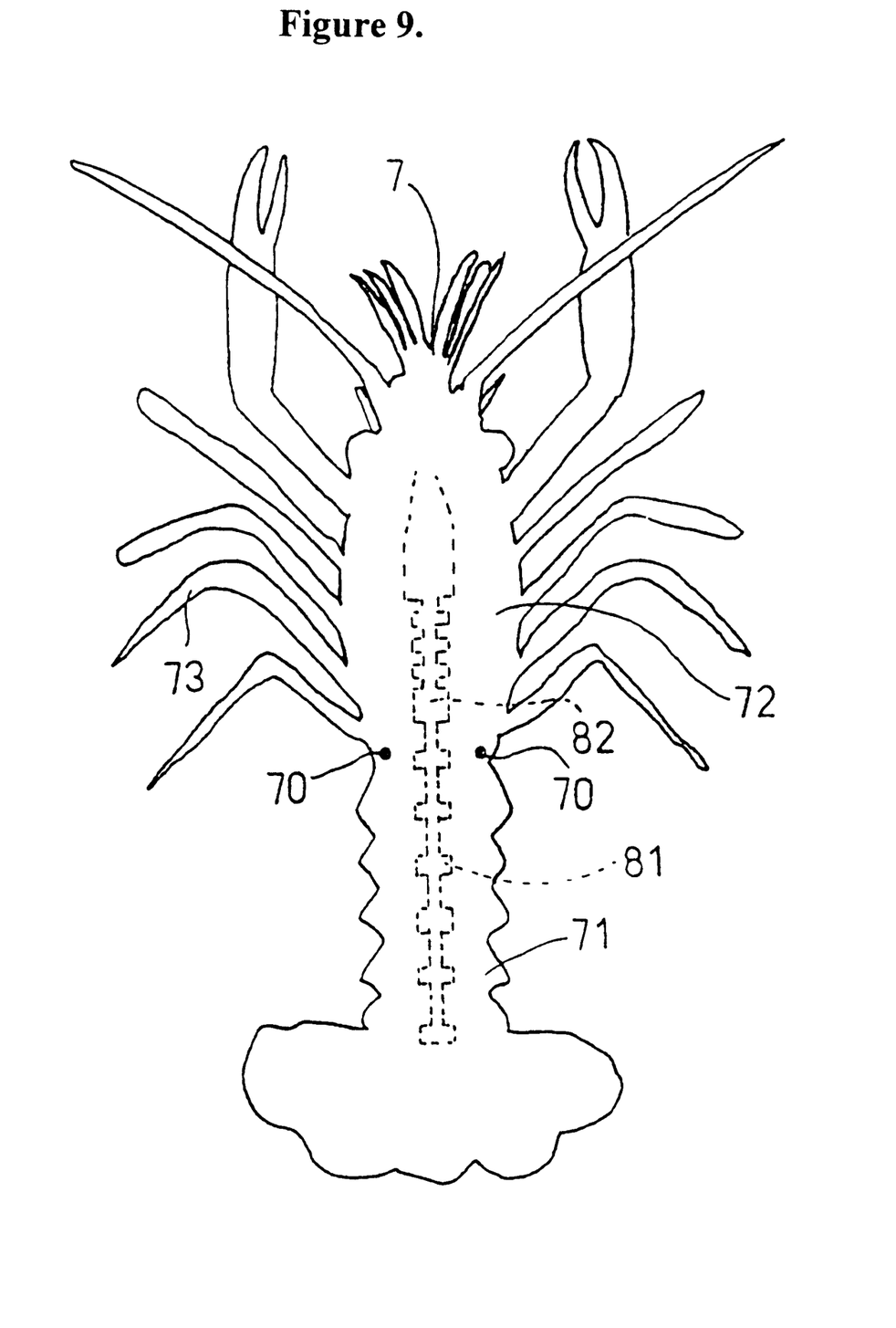
FIG. 9 is a schematic diagram illustrating a treatment method for a lobster.

As shown in FIG. 9, a nervous system 8 of a lobster 7 comprises a thoracic nerve ganglion 82 located in the thorax 72 that controls the movement of legs 73. A tail 71 houses an abdominal nerve ganglion 81, which controls the movement of the tail 71 and allows the lobster to swim. In treating a lobster such as the lobster 7, the points on either side of the inner upper portion of the tail 71 are set as treatment areas 70, to which electrodes are connected. Areas where the shell is the thinnest should be selected as the areas 70. Locations near the thoracic nerve ganglion 82 are effective.

In this experiment, a current at 70V and 50 Hz was sent through a 200 g lobster, whereupon the lobster curled its tail 71 and tensed its body. The tail 7 straightened after about five to ten seconds; but the legs 73 continued to move. The current was stopped after about 60 seconds. The legs 73 were moving, but the lobster did not thrash about. The animal was then placed in 3° C. water for one minute and then transferred to a cold-water tank containing 10° C. water, where it was preserved for 24 hours. During this period, the animal moved using the legs 73, but it did not swim with the tail 71.

If the condition of animals to be shipped is such that they may bump together and injure each other, thus lowering their value, one or several animals may be stored in a container that is immersed in water.

Figure 11:
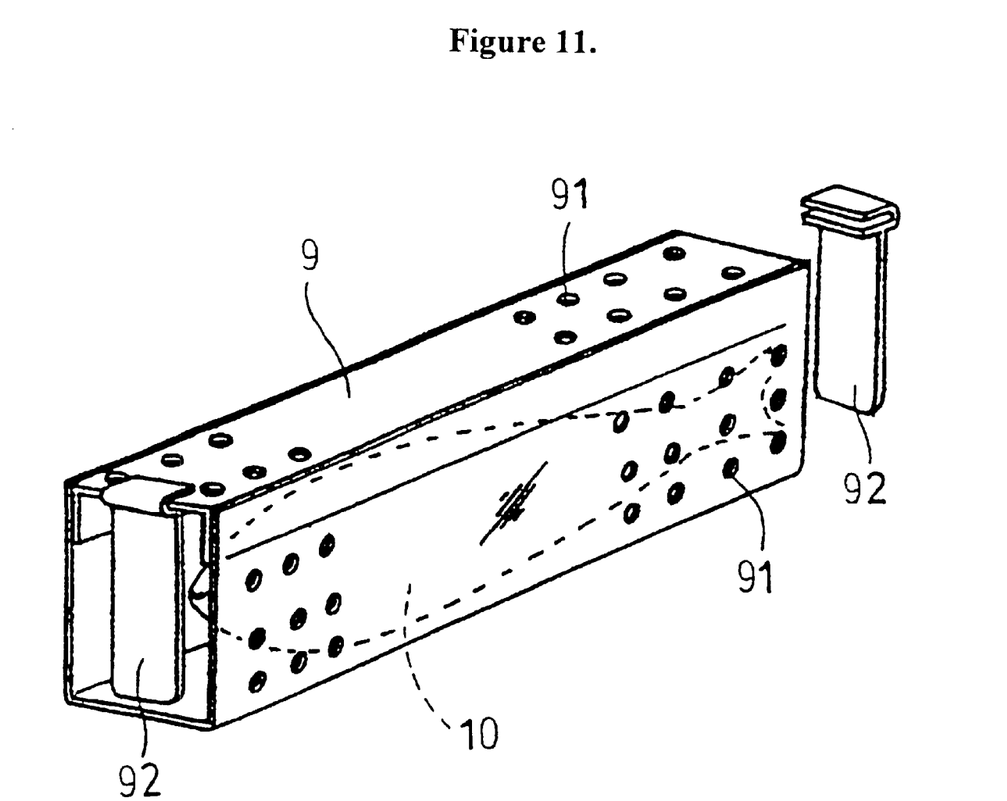
FIG. 11 is a perspective view showing one example of a container for holding fish.

For example, a container 9 for preserving a fish is box shaped and of a size that can hold one fish. A plurality of holes 91 have been punctured through its sides, the front and back are open, and latch plates 92 can be latched or removed from the front and back.

The container 9 is used by putting the fish 10—whose motor functions have been suppressed with the methods of the invention—within. The front and back of the container are closed with the latch plates 92, and the container is immersed in an aerated tank. A plurality of containers 9 may be stored in the tank in a well arranged manner to house a plurality of the fish 10, and the fish 10 may be appropriately arranged in the direction of aeration. This configuration allows an adequate supply of oxygen while preventing the fish from bumping into each other during transport, so a large volume of fish may be transported at once. As such containers minimize damage to the fish, they are well suited for fish with a particularly high value.

The invention described above, which allows aquatic animals recently captured to be safely, accurately, and repeatedly treated, has advantages outlined below. It is expected to create a tremendous revolution in the storage, distribution, and sale of live aquatic animals.

(1) The motor functions of fish are suppressed to render them motionless, but life support functions such as respiration and circulation are maintained, thus preserving freshness.

(2) Fish do not thrash about, so handling them during weighing and preparation is simple, and a large volume of fish can be transported in a confined space.

(3) Fish can be preserved at a temperature at or below the minimum survival temperature over a longer period of time, so the treatment is appropriate for transportation to distant locations.

(4) The synergism of a lack of movement and low temperatures minimizes oxygen consumption and excreta and allows fish to survive during long-term transport without the use of special preservation facilities.

INDUSTRIAL APPLICABILITY

As has been discussed, the preservation methods of aquatic animals of the invention serve to preserve the freshness of aquatic animals including fish, crustaceans such as prawns and crabs, and cephalopods such as squids and octopuses after capture when such animals are to be transported in live form mainly for distribution as food. The invention has enabled truck-based transport with simple containers when, conventionally, the transport of live fish was impossible without preservation tanks.

What is claimed is:

1. A method for preserving fish comprising:
   temporarily or semi-permanently suppressing the motor functions of the fish by piercing the spinal cord of the fish with an implement having a pointed tip and,
   preserving the fish in water having a temperature in a range between not less than 2° C. and the minimum survival temperature of the fish.

2. The method of preserving fish of claim 1, wherein the site to be pierced in the spinal cord is determined from the location of an operculum and the lateral line of the fish.

3. The method of preserving fish of claim 1, wherein the piercing is performed from the inside of the operculum.

4. The method of preserving fish of claim 1, wherein the lateral line or an extension of the lateral line of the fish is pierced.

5. The method of preserving aquatic animals of claim 1, comprising the additional steps of:
   dissecting the spinal area of a fish to determine the spatial relationship among the spinal cord, operculum and the lateral line of that species of fish, and
   determining the site for spinal piercing with an implement in that species of fish based on the spatial relationship determined.

6. The method of preserving aquatic animals of claim 5, wherein the site for spinal piercing is taken to be the intersection of the extension of the lateral line of the fish and the periphery of the operculum.

7. A method of preserving aquatic animals selected from the group consisting of fish, cephalopods and crustaceans, the method comprising:
   contacting the aquatic animal in two locations not in the immediate vicinity of the brain of the aquatic animal, with electrodes having current flowing through them and,
   preserving the aquatic animals in water having a temperature in a range between not less than 2° C. and the minimum survival temperature of the aquatic animals.

8. The method of preserving aquatic animals of claim 7, wherein the amount of time the current is passed through nerves of the aquatic animal is determined from the respiration of the animal and the rigidity in the animal.

9. The method of preserving aquatic animals of claim 7, comprising the additional step of:
   immersing the aquatic animal that has been contacted by electrodes having a current running through them, in water having a temperature at least 5° C. below the minimum survival temperature of the aquatic animal for at least 30 seconds.

10. The method of preserving aquatic animals of claim 9, wherein the amount of time the aquatic animal is immersed in water having a temperature at least 5° C. below the minimum survival temperature is from one to five minutes.

11. A method for preserving aquatic animals selected from the group consisting of fish, cephalopods and crustaceans, the method comprising:
   temporarily suppressing the motor functions of the aquatic animal by a means selected from the group consisting of piercing the spinal cord of the aquatic animal with an implement having a pointed tip and contacting the aquatic animal in two locations not in the immediate vicinity of the brain with electrodes having a current running through them; and
   preserving the aquatic animal in disinfected water.

* * * * *